United States Patent
Byun et al.

(10) Patent No.: US 7,522,253 B2
(45) Date of Patent: Apr. 21, 2009

(54) METHOD OF FORMING A LIQUID CRYSTAL LAYER USING AN INK JET SYSTEM

(75) Inventors: Young-Sang Byun, Gyeongsangbuk-do (KR); Moo-Yeol Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/028,433

(22) Filed: Dec. 28, 2001

(65) Prior Publication Data
US 2002/0167638 A1 Nov. 14, 2002

(30) Foreign Application Priority Data
May 10, 2001 (KR) ............................ 2001-25388

(51) Int. Cl.
*G02F 1/13* (2006.01)
(52) U.S. Cl. ...................... 349/187; 349/189
(58) Field of Classification Search ............. 349/187, 349/189, 190, 106, 153, 110
See application file for complete search history.

(56) References Cited
U.S. PATENT DOCUMENTS

| | | | | |
|---|---|---|---|---|
| 3,512,173 A | * | 5/1970 | Damouth | 347/76 |
| 4,018,383 A | * | 4/1977 | Paton et al. | 239/4 |
| 5,619,234 A | * | 4/1997 | Nagato et al. | 347/55 |
| 5,978,065 A | * | 11/1999 | Kawasumi et al. | 349/188 |
| 6,055,035 A | * | 4/2000 | von Gutfeld et al. | 349/187 |
| 6,331,884 B1 | * | 12/2001 | Masazumi et al. | 349/156 |
| 6,583,848 B2 | * | 6/2003 | Hashimoto et al. | 349/187 |
| 2002/0063842 A1 | * | 5/2002 | Gyoda | |

* cited by examiner

*Primary Examiner*—Thoi V Duong
(74) *Attorney, Agent, or Firm*—Birch, Stewart, Kolasch & Birch, LLP

(57) ABSTRACT

A method of forming a liquid crystal layer on a substrate having a sealed pattern, which includes the steps of preparing a liquid crystal material in a projecting portion; applying a vibration and a pressure to the projecting portion so as to emit the liquid crystal material from the projecting portion, and depositing the emitted liquid crystal material on the substrate. Also, an apparatus is provided for forming a liquid crystal layer on a substrate having a sealed pattern which includes a projecting portion having a liquid crystal material; a resonator for generating a vibration, and a resonating plate for transmitting the vibration to the projecting portion.

20 Claims, 3 Drawing Sheets

METHOD OF FORMING A LIQUID CRYSTAL LAYER USING AN INK JET SYSTEM

BACKGROUND OF THE INVENTION

This application claims the benefit of Korean Patent Application No. 2001-25388, filed on May 10, 2001, under 35 U.S.C. § 119, the entirety of which is hereby incorporated by reference.

1. Field of the Invention

The present invention relates to a liquid crystal display device, and more particularly to a method of fabricating a liquid crystal cell.

2. Description of Related Art

Recently, liquid crystal display (LCD) devices which are light and thin, and posses low power consumption characteristics are used in office automation equipment, video units and the like. Such LCDs typically use a liquid crystal (LC) interposed between upper and lower substrates with an optical anisotropy. The upper substrate, referred to as a color filter substrate, usually includes common electrodes and color filters. The lower substrate, referred to as an array substrate, includes switching elements, such as thin film transistors (TFTs) and pixel electrodes. Since the LC has thin and long LC molecules causing an alignment direction of the LC molecules, the alignment direction of the LC molecules can be controlled by applying an electric field to the LC molecules.

A brief explanation of a conventional liquid crystal cell manufacturing process and its operation will be discussed for better understanding of the present invention.

Common electrodes and pixel electrodes are formed on upper and lower substrates, respectively. A seal is then formed on the lower substrate. The upper and lower substrates are then bonded together using a seal such that the common electrodes of the upper substrate and the pixel electrodes of the lower substrate face each other, forming liquid crystal cells. Liquid crystal material is then injected into those cells through injection holes. The injection holes are then sealed. Finally, polarizing films are attached to the outer surfaces of the upper and lower substrates. The pixel and common electrodes generate electric fields that control the light passing through the liquid crystal cells. By controlling the electric fields, desired characters or images are displayed.

The liquid crystal cell process has few repeated steps compared with the TFT process or the color filter process. The whole process can be divided into the steps of forming the orientation film, forming the cell gap, injecting the liquid crystal and cutting the liquid crystal cell.

FIG. 1 is a flow chart illustrating a fabrication process of a conventional liquid crystal cell.

At step ST1, an initial cleaning is performed after an upper substrate and a lower substrate are prepared. This step is for eliminating the impurities on the substrate before forming an orientation film.

At step ST2, the orientation film is formed on the upper and lower substrates. This step includes deposition and rubbing processes of the orientation film or polymer thin film. The formation of the orientation film enables the liquid crystal to operate normally by the uniform orientation of the liquid crystal molecules and is needed for the uniform display property. The most important part of this step is to deposit the orientation film uniformly over the wide area. A polymer compound of the polyimide family is widely used for the typical orientation film, and the deposited polyimide thin film polymer compound becomes the orientation film through the preliminary drying and the hardening process. The rubbing process scours the orientation film along one direction with the rubbing cloth and the liquid crystal molecules align along the rubbing direction.

At step ST3, a seal printing and a spacer deposition on the substrates are performed. The seal patterns form cell spaces that will receive the liquid crystal material and prevent the interposed liquid crystal material from leaking out of the completed liquid crystal cell. The seal patterning is the process of patterning a thermosetting plastic mixed with glass fiber.

A screen-print method is widely used for this process. The next process is spraying the spacers. The spacers have a definite size and act to maintain a precise and uniform space between the upper and the lower substrates. Accordingly, the spacers are placed with a uniform density on the substrate using either a wet spray method, in which the spacers are mixed in an alcohol and then sprayed; or a dry spray method, in which only the spacers are sprayed.

At step ST4, the upper and lower substrates are aligned and attached. The alignment margin, which is less than a few micrometers, is determined by the substrate design. If the upper and lower substrates are aligned and attached beyond the alignment margin, light will leak out such that the liquid crystal cell cannot adequately perform its function.

At step ST5, the liquid crystal cell fabricated through the previous four steps is cut into unit liquid crystal cells. Generally, after a plurality of unit liquid crystal cells are formed on a wide glass substrate, the liquid crystal cell is divided into the plurality of unit liquid crystal cells. The cutting process typically includes a scribing process using a diamond pen to form cutting lines on the substrate, and a breaking process for separating by force the substrate along the scribed lines.

At step ST6, the liquid crystal material is injected into the unit liquid crystal cells. Since each unit liquid crystal cell is several hundred square centimeters in area but has only a few micrometers gap between the substrates, a vacuum injection method using a pressure difference is effectively and widely used. Generally, since injecting the liquid crystal material into the unit liquid crystal cells takes the longest manufacturing time, for manufacturing efficiency, it is important to have optimum conditions for the vacuum injection process.

A sealing process, which prevents the liquid crystal material from leaking through the injection hole, is performed after the injection.

After the injection and sealing processes, an inspection process and a grinding process are performed. Then polarization plates are attached on the outer surfaces of the upper and lower substrates so that the liquid crystal cell can be completed.

However, in this process of manufacturing a liquid crystal cell, the total turnaround time (TAT) becomes extended due to the time required for the liquid crystal injection, and thus the fabrication efficiency and production yields are decreased.

To solve these problems, a dispenser method, in which the liquid crystal materials are distributed to the substrate by a syringe, is suggested. The deposition process of the liquid crystal materials by the dispenser method is performed between steps ST3 and ST4 of FIG. 1. In the dispenser method, since the liquid crystal layer is directly formed onto the substrate, the total TAT can be decreased due to the reduction of time for the deposition process of the liquid crystal material.

FIG. 2 is a schematic view showing a deposition process of liquid crystal materials by a conventional dispenser method.

In FIG. 2, liquid crystal materials 14 are dispensed from a syringe 16 onto an interior of a seal pattern 10 of a lower substrate 12 by a point dotting method. The syringe 16 is filled with liquid crystal materials 14 and spaced apart from the lower substrate 12.

After this deposition process, an upper substrate is temporarily fixed to the lower substrate with an assembly and the upper and lower substrates are pressed so that the dispensed liquid crystal materials can be spread to the entire substrates. Then the upper and lower substrates are attached by hardening the seal pattern through a process of UV and heat treatment.

In the process of forming the liquid crystal layer by the conventional vacuum injection method, the injection hole is formed before this process and sealed after this process. On the other hand, in the process of forming a liquid crystal layer by the conventional dispenser method, since the liquid crystal materials are directly dispensed onto the substrate, the forming and sealing processes of the injection hole are not necessary.

However, the process of forming a liquid crystal layer by the conventional dispenser method has some drawbacks. First, in the case of large-sized substrate, the dispensing time becomes long due to an increase in the number of points.

Second, to lessen the dispensing time, if the volume of one droplet of the liquid crystal materials is increased, the uniformity of the volume is hard to maintain. Moreover, if the size of the point is increased, the cell gap does not become uniform due to a reduction of the planarization during the attachment process of the upper and lower substrates and the spots of the display occur due to the damage of the orientation film.

Third, if impurities exist on the substrate or in the liquid crystal materials before the deposition process, these impurities produce partial surface spots between the dispensed region and the other region.

SUMMARY OF THE INVENTION

Accordingly, the present invention is directed to a liquid crystal display device that substantially obviates one or more of the problems due to the limitations and disadvantages of the related art.

An object of the present invention is to provide a method of depositing liquid crystal materials wherein the liquid crystal materials are simultaneously deposited on a wide area in a short time.

Additional features and advantages of the present invention will be set forth in the description which follows, and in part will be apparent from the description, or may be learned by a practice of the present invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of forming a liquid crystal layer on a substrate having a sealed pattern includes: preparing a liquid crystal material in a projecting portion; applying a vibration and a pressure to the projecting portion so as to emit the liquid crystal material from the projecting portion, and depositing the emitted liquid crystal material on the substrate.

In another aspect, an apparatus of forming a liquid crystal layer on a substrate having a seal pattern includes: a projecting portion having a liquid crystal material; a resonator generating a vibration, and a resonating plate transmitting the vibration to the projecting portion.

It is to be understood that both the foregoing general description and the following detailed description are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF PREFERRED EMBODIMENTS

Figure 3:
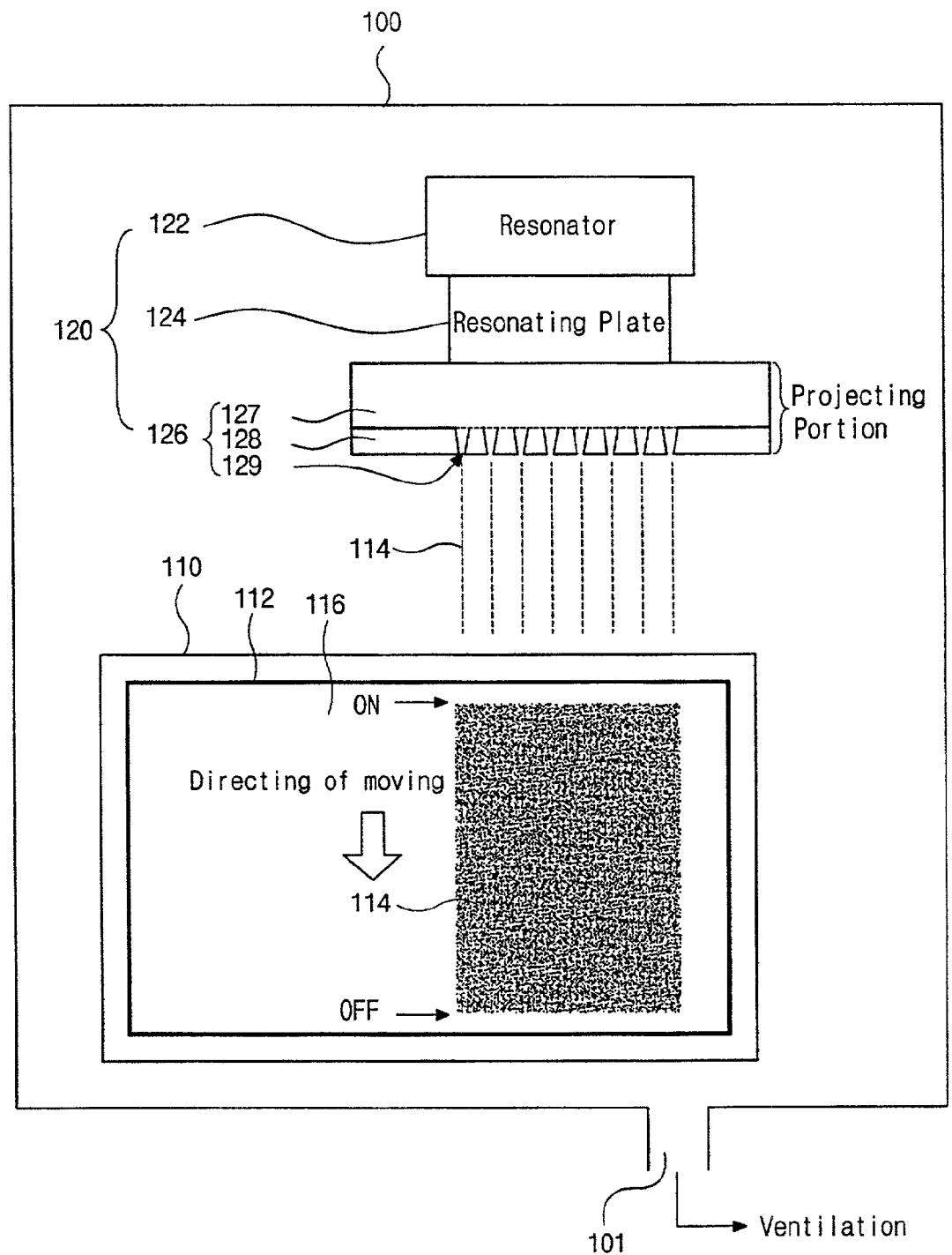
FIG. 3 is a schematic view of an embodiment of the present invention showing the deposition process of liquid crystal materials by an inkjet method.

Reference will now be made in detail to the preferred embodiments of the present invention, an example of which being illustrated in the accompanying drawings. FIG. 3 is a schematic view showing a deposition process of liquid crystal materials by an inkjet method according to an embodiment of the present invention. In FIG. 3, a vacuum chamber 100 includes a vent portion 101. A substrate 110 and an inkjet system 120 are spaced apart from each other in the vacuum chamber 100. The substrate 110 is disposed at the bottom of the vacuum chamber 100 and a seal pattern 112 is formed at the edge of the substrate 110. The inkjet system 120 includes a resonator 122, a resonating plate 124 and a projecting portion 126. The resonator 122 generates vibration of a specific frequency according to an applied voltage and the resonating plate 124 is connected to the resonator 122 so that it can vibrate with the same frequency. The projecting portion 126 is disposed under the resonating plate 124 and emits the liquid crystal materials 114 due to the vibration of the resonating plate 124. The projecting portion 126 includes an IN/OUT portion 127 of liquid crystal materials and a nozzle plate 128 under the IN/OUT portion 127, having a plurality of orifices 129. The plurality of orifices 129 is formed on the bottom surface of the nozzle plate 128 and liquid crystal materials 114 are uniformly emitted onto the substrate 100 through the plurality of orifice 129.

The ON/OFF of the voltage applied to the inkjet apparatus 120 is adjusted by the position of the moving substrate 110. In the forming process of the liquid crystal layer, according to the present invention, a voltage is applied to the resonator 122 of the inkjet system 120 (ON) at a first position, which is an upper end of the substrate 110. Then, the resonator 122 generates a vibration of a specific frequency and the resonating plate 124 also has a vibration of the same frequency. Accordingly, a constant projecting pressure is maintained in the projecting portion 126 and liquid crystal materials are emitted to a depositing portion 116 of the substrate 110 through the plurality of orifices 129 of the nozzle plate 128. After the beginning of the emission of the liquid crystal materials 114, the substrate 110 moves to a second position, which is a lower end of the substrate 110, and the liquid crystal materials 114 are uniformly deposited during this moving of the substrate 110. The voltage applied to the inkjet system 120 is stopped at the second position of the substrate 110. This process is repeated for a residual depositing portion continuously.

Figure 1:
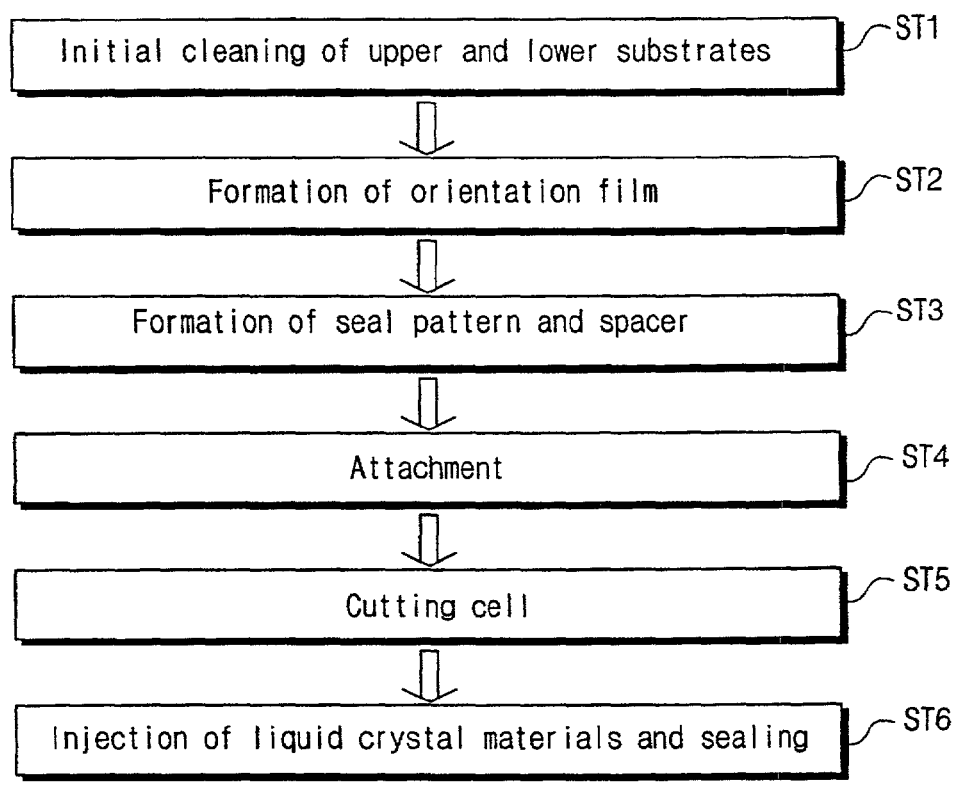
FIG. 1 is a flow chart illustrating a fabrication process of a conventional liquid crystal cell.
Figure 2:
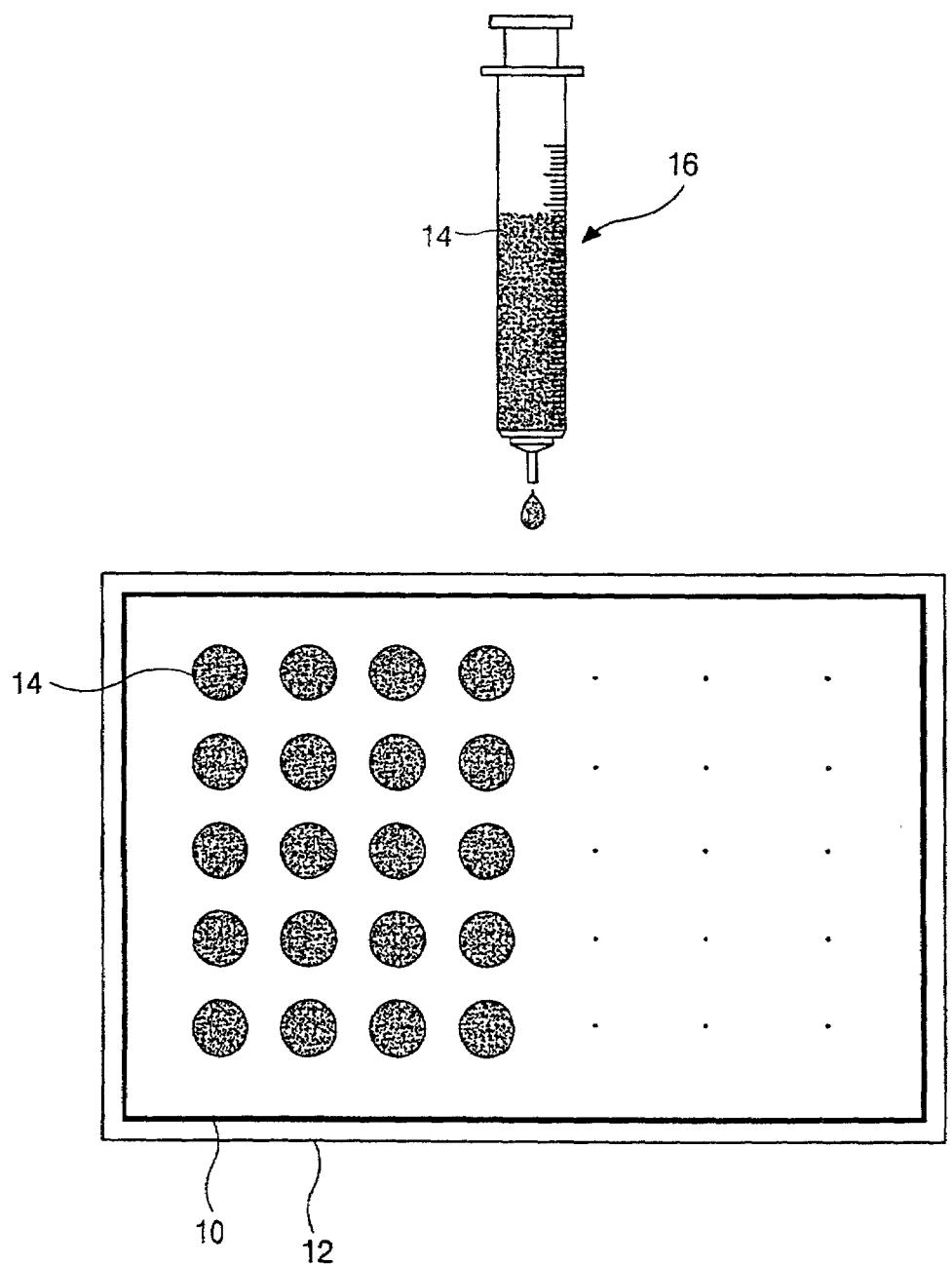
FIG. 2 is a schematic view showing a deposition process of liquid crystal materials by a conventional dispenser method.

The substrate 110 is a lower substrate through the array process and ST1 to ST3 of FIG. 1 and includes a black matrix under the seal pattern 112. The black matrix prevents light leakage from a region where the liquid crystal layer is not operated. The black matrix is formed at a region corresponding to the seal pattern so that it can effectively prevent the spots of display. Moreover, since the intensity and frequency of the vibration is controlled according to the applied voltage of the resonator of the inkjet system, a cell gap is easy to form by adjusting the volume of the emitted liquid crystal materials.

In another embodiment of the present invention, the liquid crystal materials can be emitted on the entire depositing portion during one-step moving by varying the size of nozzle plate or the number of orifices according to the substrate size.

Consequently, in the deposition process of the liquid crystal materials by using the inkjet system according to the present invention, since the surface area of the deposited liquid crystal materials is wide, the air bubble included in the liquid crystal materials are easy to eliminate. Also, the spots of the orientation film or surface of the substrate can be prevented. Moreover, the process time can be reduced by increasing the pressing speed of the attachment process and decreasing the waiting time before the hardness of the seal pattern. Since the surface of the substrate is more planarized in the attachment process, a uniform cell gap is achieved.

It will be apparent to those skilled in the art that various modifications and variation can be made in the method of manufacturing a flat pane display device of the present invention without departing from the spirit or scope of the invention. Thus, it is intended that the present invention cover the modifications and variations of the present invention as defined by the appended claims and the equivalents thereof.

What is claimed is:

1. A method of forming a liquid crystal layer on a substrate, comprising:
    preparing a liquid crystal material in a projecting portion;
    placing a resonating plate between a resonator and the projecting portion and outside of the projecting portion, wherein the resonator, the resonating plate and the projecting portion are arranged in a direction perpendicular to the substrate;
    applying an on voltage to the resonator during emitting of the liquid crystal material to generate a vibration with only a specific frequency by the resonator so as to apply a pressure to the projecting portion to emit the liquid crystal material from the projecting portion, wherein the generated vibration is transmitted from the resonator to the projecting portion through the resonating plate such that the resonating plate vibrates with the same specific frequency;
    moving the substrate in one direction; and
    depositing the liquid crystal material from the projecting portion uniformly onto the substrate during the moving of the substrate in the one direction, the substrate having a seal pattern and a black matrix at a region corresponding to the seal pattern,
    wherein the liquid crystal material is emitted from the projecting portion substantially in the same direction, which is perpendicular to the substrate, as the resonator vibrates.

2. The method according to claim 1, wherein the projecting portion has a nozzle plate containing a plurality of orifices, the nozzle plate adjusting the applied pressure for omitting the liquid crystal material, the liquid crystal material being emitted through the plurality of orifices.

3. The method according to claim 1, wherein the liquid crystal material is emitted and deposited in a vacuum chamber.

4. The method according to claim 1, wherein the substrate has the black matrix under the sealed pattern.

5. The method according to claim 4, wherein the liquid crystal material start and stop is deposited on the black matrix.

6. The meted according to claim 1 wherein the on voltage is applied according to a position of the moving substrate.

7. The method according to claim 1, wherein the liquid crystal material is emitted from the projecting portion by only the pressure applied to the projecting portion.

8. The method according to claim 1, wherein the liquid crystal material is emitted front the projecting portion by the pressure applied to the projecting portion without applying an electric field to the liquid crystal material during emitting of the liquid crystal material.

9. The method according to claim 1, wherein the step of placing the resonating plate between the resonator and the projecting portion includes making a first surface of the resonating plate to be in contact with the resonator and making a second surface of the resonating plate to be in contact with an upper surface of the projecting portion.

10. The method according to claim 9, wherein the resonating plate is spaced apart from the liquid crystal material by the projecting portion.

11. An apparatus for forming a liquid crystal layer on a substrate, comprising:
    a projecting portion for emitting a liquid crystal material;
    a resonator for generating a vibration with only a specific frequency upon application of an on voltage to the resonator during emitting of the liquid crystal material;
    a resonating plate located between the resonator and the projecting portion and outside of the projecting portion, the resonating plate vibrating with the same specific frequency and transmitting the vibration to the projecting portion so as to apply a pressure to the projecting portion to emit the liquid crystal material from the projecting portion, wherein the resonator, the resonating plate and the projecting portion are arranged in a direction perpendicular to the substrate; and
    a stage for moving the substrate in one direction during emitting of the liquid crystal material from the projecting portion uniformly onto the substrate, the substrate having a seal pattern and a black matrix at a region corresponding to the seal pattern,
    wherein the liquid crystal material is emitted from the projecting portion substantially in the same direction, which is perpendicular to the substrate, as the resonator vibrates.

12. The apparatus according to claim 11, wherein the projecting portion has a nozzle plate containing a plurality of orifices, the nozzle plate adjusting the applied pressure for emitting the liquid crystal material, the liquid crystal material being emitted through the plurality of orifices.

13. The apparatus according to claim 11, wherein means is provided for moving the stage.

14. The apparatus according to claim 11, further comprising a vacuum chamber for encompassing the projecting portion, the resonator and the resonating plate.

15. The apparatus according to claim 11, wherein means is provided for generating vibration in the resonator.

16. The apparatus of claim 9, wherein means is provided for applying the on voltage according to a position of the moving substrate.

17. The apparatus according to claim 11, wherein the liquid crystal material is endued from the projecting portion by only the pressure applied to the projecting portion.

18. The apparatus according to claim 11, wherein the liquid crystal material is emitted from the projecting portion by the pressure applied to the projecting portion with out applying an electric field to the liquid crystal material during emitting of the liquid crystal material.

19. The apparatus according to claim 11, wherein a first surface of the resonating plate is in contact with the resonator and a second surface of the resonating plate is in contact with an upper surface of the projecting portion.

20. The apparatus according to claim 19, wherein the resonating plate is spaced apart from the liquid crystal material by the projecting portion.

* * * * *